United States Patent
Hattori (10) Patent No.: US 8,218,974 B2
(45) Date of Patent: Jul. 10, 2012

(54) OPTICAL TRANSMITTER AND OPTICAL TRANSMISSION METHOD

(75) Inventor: Keita Hattori, Hitachi (JP)

(73) Assignee: Hitachi Cable, Ltd., Tokyo (JP)

(*) Notice: Subject to any disclaimer, the term of this patent is extended or adjusted under 35 U.S.C. 154(b) by 705 days.

(21) Appl. No.: 11/808,107

(22) Filed: Jun. 6, 2007

(65) Prior Publication Data

US 2008/0025732 A1    Jan. 31, 2008

(30) Foreign Application Priority Data

Jul. 26, 2006  (JP) .................................. 2006-203278

(51) Int. Cl.
*H04B 10/04* (2006.01)
(52) U.S. Cl. ......... 398/195; 398/194; 398/197; 398/159
(58) Field of Classification Search .................. 398/182, 398/192–198, 200, 158, 159, 201
See application file for complete search history.

(56) References Cited

U.S. PATENT DOCUMENTS

| | | | |
|---|---|---|---|
| 5,337,323 A | | 8/1994 | Rokugawa et al. |
| 7,149,425 B2 * | | 12/2006 | Gripp et al. ..................... 398/34 |
| 2001/0027688 A1 * | | 10/2001 | Yamanaka ................... 73/865.6 |
| 2006/0045520 A1 * | | 3/2006 | Nakano et al. .................. 398/33 |
| 2006/0093362 A1 * | | 5/2006 | Welch et al. ..................... 398/87 |

FOREIGN PATENT DOCUMENTS

| | | |
|---|---|---|
| JP | 06-318928 | 11/1994 |
| JP | 08-237204 | 9/1996 |
| JP | 2000-201109 | 7/2000 |
| JP | 3130571 | 11/2000 |

OTHER PUBLICATIONS

Japanese Office Action dated Apr. 26, 2011 (with English translation).

* cited by examiner

*Primary Examiner* — M. R. Sedighian
(74) *Attorney, Agent, or Firm* — McGinn IP Law Group, PLLC

(57) ABSTRACT

An optical transmitter and an optical transmission method includes a plurality of light-emitting elements, a plurality of light-receiving elements for monitoring optical outputs from the light-emitting elements, a linear operation circuit for calculating optical output monitor signals by removing crosstalk parts from a plurality of photoelectric conversion currents outputted from the light-receiving elements, and a drive circuit for driving individually currents to apply to the light-emitting elements based on the optical output monitor signals.

14 Claims, 8 Drawing Sheets

OPTICAL TRANSMITTER AND OPTICAL TRANSMISSION METHOD

The present application is based on Japanese Patent Application No. 2006-203278 filed on Jul. 26, 2006, the entire contents of which are incorporated herein by reference.

BACKGROUND OF THE INVENTION

1. Field of the Invention

This invention relates to a multi-channel type optical transmitter (and an optical transmission method) which monitors an optical output, and control multiple laser diodes (LD) based on the monitored optical output.

2. Description of the Related Art

When data are transmitted by an optical communication in parallel, a laser array device which integrates a plurality of LDs is used as a light source. As the laser array device, for example, a semiconductor laser array device is known, in which one of multiple semiconductor laser units is set as a reference semiconductor laser unit. Feedback control is performed by monitoring light only about the reference semiconductor laser unit. The other semiconductor laser units are controlled to keep a ratio between a bias current of the reference semiconductor laser unit and a bias current of the other semiconductor laser units constant. An optical output of each semiconductor laser unit is stabilized (e.g., see Japanese Patent JP-B-3130571, paragraph 0008~0012, FIG. 1).

However, according to the conventional structures, since the optical outputs of the multiple semiconductor laser units are not detected individually, when there is a variation of a thermal characteristic between the multiple semiconductor laser units, it is difficult to control exactly to keep the optical outputs constant. Further, since the optical outputs of the multiple semiconductor laser units are not detected individually, it is impossible to detect a performance degradation or a failure of each semiconductor laser unit over their service life.

Therefore, prior to the present invention, there has been no conventional system (or method) which can provide an optical transmitter (or an optical transmission method) which can monitor individually each of the optical outputs of the semiconductor laser units, and control individually each light-emitting element of the semiconductor laser units according to the monitored result.

SUMMARY OF THE INVENTION

In view of the foregoing and other exemplary problems, drawbacks, and disadvantages of the conventional methods and structures, an exemplary feature of the present invention is to provide an optical transmitter (and an optical transmission method) which can monitor individually each of the optical outputs of the semiconductor laser units, and can control individually each light-emitting element of the semiconductor laser units according to the monitored result.

According to one exemplary aspect of the invention, an optical transmitter includes:

a plurality of light-emitting elements;

a plurality of light-receiving elements for monitoring optical outputs from the light-emitting elements;

a linear operation circuit for calculating optical output monitor signals by removing crosstalk parts from a plurality of photoelectric conversion currents outputted from the light-receiving elements, the crosstalk parts arising from adjacent light-emitting elements; and a drive circuit for driving individually currents to apply to the light-emitting elements based on the optical output monitor signals.

According to another exemplary aspect of the invention, an optical transmission method includes:

monitoring optical outputs from a plurality of light-emitting elements;

calculating optical output monitor signals by removing crosstalk parts from a plurality of photoelectric conversion currents outputted from a plurality of light-receiving elements, the crosstalk parts arising from adjacent light-emitting elements; and driving individually currents to apply to the light-emitting elements based on the optical output monitor signals.

According to the present invention, even if the monitor light is inputted to the light-receiving element from the adjacent light-emitting elements other than the light-emitting element corresponding to the light-receiving element, the crosstalk parts can be removed by the linear operation circuit, and the monitor light from the proper light-emitting element can be accurately monitored and controlled.

The above exemplary modifications may be made alone or in any combination thereof.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIGS. 3A-3C are exemplary constitutions of an optical system.

FIGS. 4A and 4B are an incidence pattern of monitor lights to multiple PDs.

DETAILED DESCRIPTION OF THE EXEMPLARY EMBODIMENTS

Referring now to the drawings, and more particularly to FIGS. 1-8, there are shown exemplary embodiments of the methods and structures according to the present invention.

Exemplary Embodiment 1

Constitution of Optical Transmitter

Figure 1:
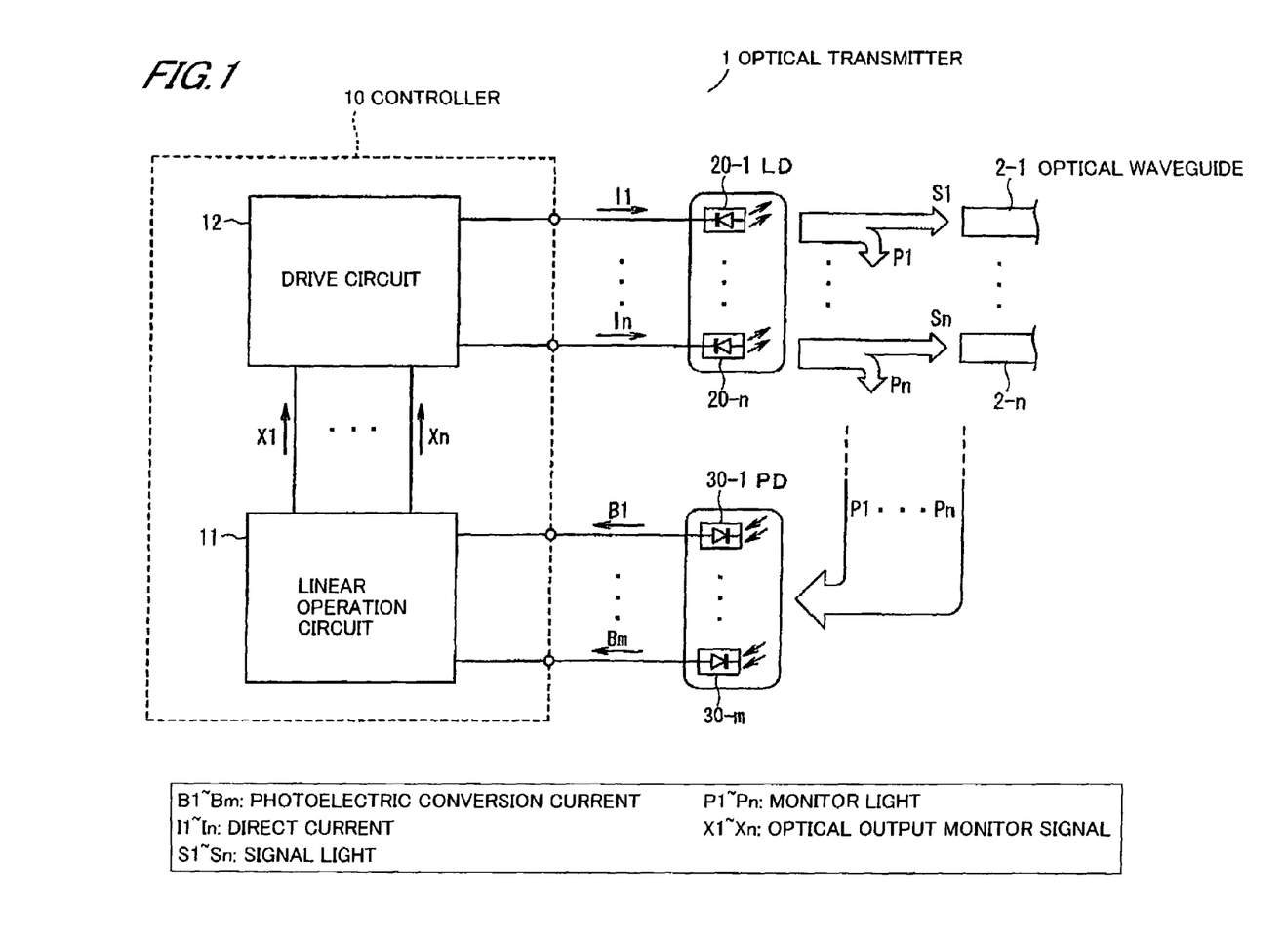
FIG. 1 is a block diagram showing an optical transmitter 1 in a first exemplary embodiment according to the present invention.

FIG. 1 shows an optical transmitter in a first exemplary embodiment according to the present invention. The optical transmitter 1 includes a controller 10, laser diodes (LD) 20-1~20-n as light-emitting elements which are connected to the controller 10, and photo diodes (PD) 30-1~30-m for monitoring monitor lights P1~Pn which are optical outputs from the LDs 20-1~20-n.

Each of the LDs 20-1~20-n is connected to n optical waveguides 2-1~2-n including an optical fiber, a glass optical waveguide, or a polymer optical waveguide, so as to transmit the optical outputs (signal lights S1~Sn) to a transmission media such as the optical fiber and space.

A modulation circuit applies a modulation current according to a logic level of n data signals inputted from an external device such as an optical communication apparatus or a computer to the LDs 20-1~20-n. The modulation circuit is omitted in FIG. 1.

The LDs 20-1~20-n can emit light in an intensity according to direct currents I1~In applied by a drive circuit 12.

The PDs 30-1~30-m are disposed in an area where the monitor light can reach, monitor a part of the optical outputs of the LDs 20-1~20-n, and output photoelectric conversion currents B1~Bm converted from the monitor lights P1~Pn to a linear operation circuit 11. The number m of the PDs 30-1~30-m is equal to or more than the number n of the LDs 20-1~20-n (m≧n).

The controller 10 includes the "m input n output" linear operation circuit 11 to which the m photoelectric conversion currents B1~Bm outputted from the PDs 30-1~30-m are inputted and from which n optical output monitor signals X1~Xn are outputted, and the drive circuit 12 for generating the direct currents I1~In according to a level of the optical output monitor signals X1~Xn from the linear operation circuit 11 and driving the LDs 20-1~20-n.

Constitution of Linear Operation Circuit

Figure 2:
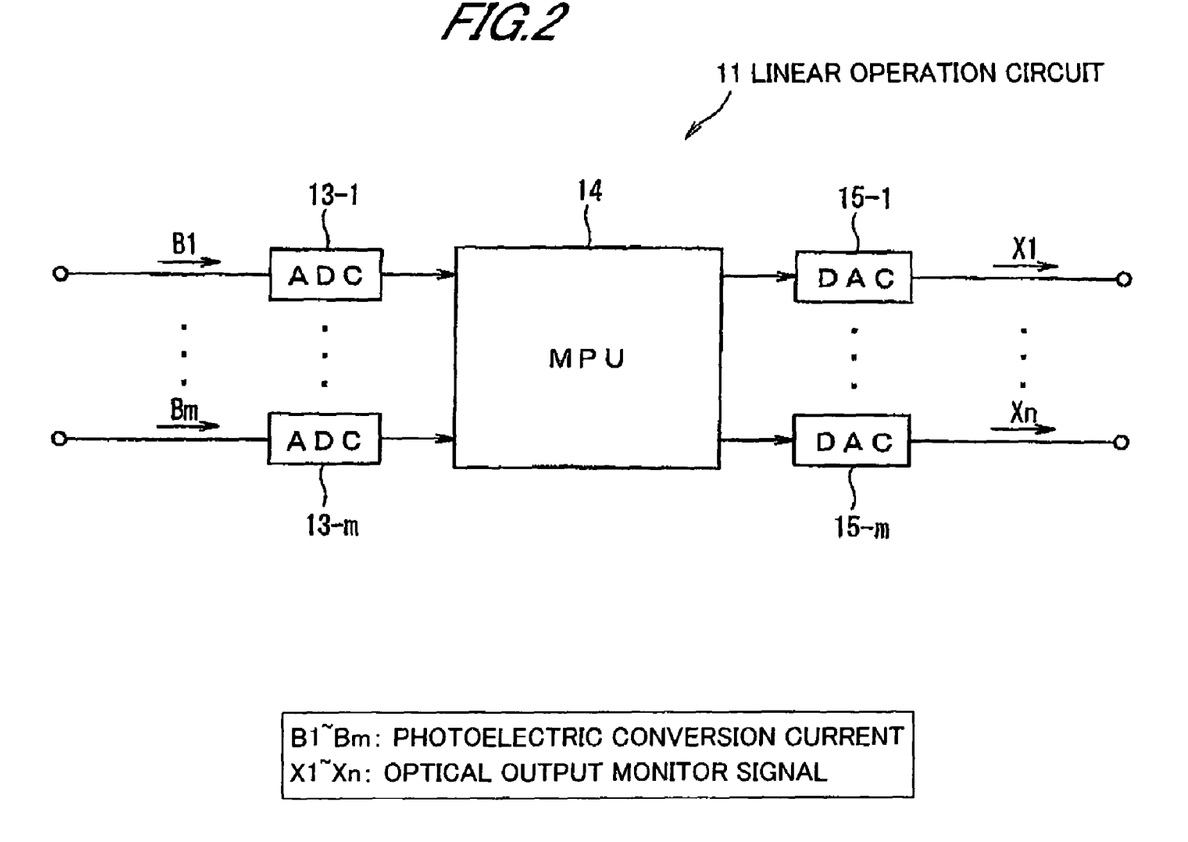
FIG. 2 is a block diagram showing a description of a linear operation circuit 11 of FIG. 1.

FIG. 2 shows a constitution of the linear operation circuit 11. The linear operation circuit 11 includes analog/digital (A/D) converters (ADC) 13-1~13-m, a micro processor unit (MPU) 14 which operates according to a program as mentioned below, and digital/analog (D/A) converters (DAC) 15-1~15-n.

Constitution of Optical System

Figure 3A:
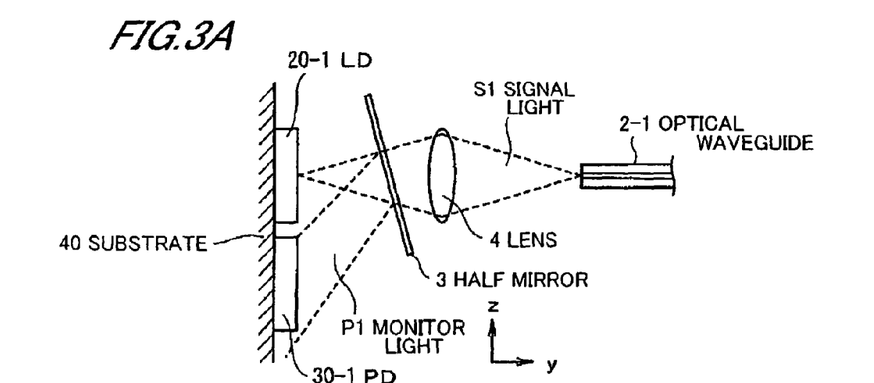
FIG. 3A is a configuration diagram showing a first exemplary constitution.
Figure 3B:
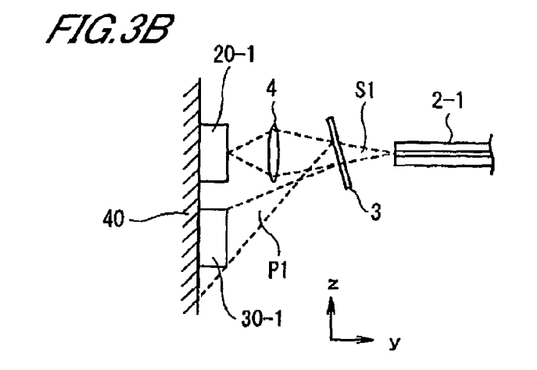
FIG. 3B is a configuration diagram showing a second exemplary constitution.
Figure 3C:
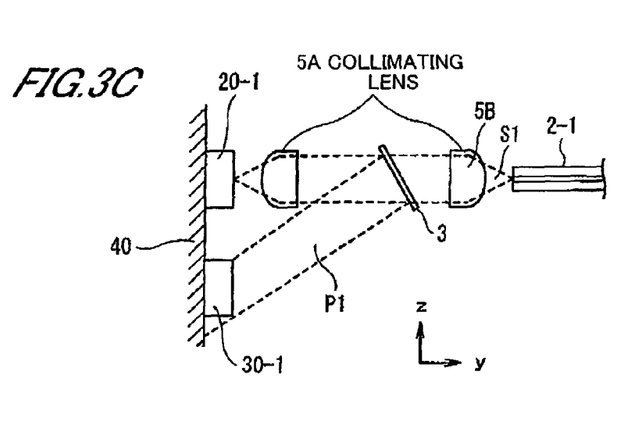
FIG. 3C is a configuration diagram showing a third exemplary constitution.

FIGS. 3A-3C show exemplary constitutions of an optical system, and more specifically FIG. 3A shows a first exemplary constitution, FIG. 3B shows a second exemplary constitution, and FIG. 3C shows a third exemplary constitution. Hereinbelow, a combination of the LD 20-1, the PD 30-1, and the optical waveguide 2-1 is described.

Figure 4A:
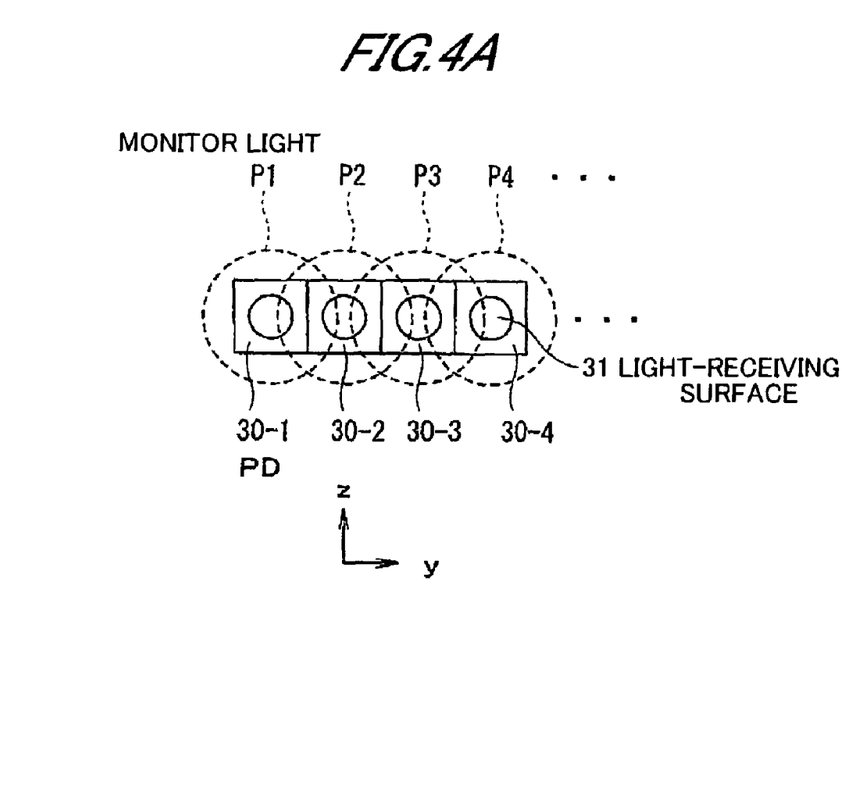
FIG. 4A is a schematic layout in case that there is interference caused by spreading of the monitor lights.
Figure 4B:
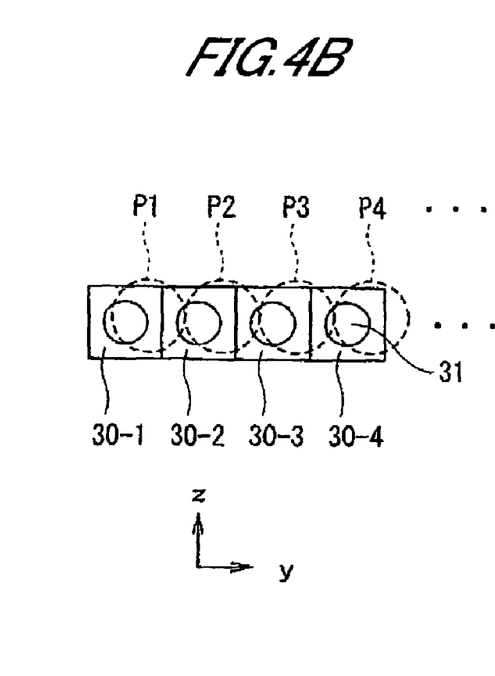
FIG. 4B is a schematic layout in case that there is interference caused by displacement of an optical component configuration.

FIGS. 4A and 4B shows an incidence pattern of the monitor lights to the multiple PDs, and more specifically FIG. 4A shows a case in which there is interference caused by spreading of the monitor lights, and FIG. 4B shows a case in which there is interference caused by displacement of an optical component configuration. In FIGS. 4A and 4B, the PDs 30-1~30-m include a circular light-receiving surface 31, and the monitor lights P1~Pn are inputted to the light-receiving surface 31.

In FIG. 3A, a half mirror 3 and a convex lens 4 are disposed on an optical axis of a light path between the LD 20-1 and the optical waveguide 2-1, and the PD 30-1 is disposed on a reflection light path of the half mirror 3. In this exemplary embodiment, the LD 20-1 and the PD 30-1 are mounted on a same substrate 40. As shown in FIG. 4A, since in this constitution, the monitor lights P1~Pn are divergent light beams, areas of the monitor lights P1~Pn incident toward the PDs 30-1~30-m are spread, and overlap between adjacent light beams of the monitor lights P1~Pn occur. Therefore, each PD will receive the monitor light P which is for an adjacent PD.

In FIG. 3B, positions of the half mirror 3 and the convex lens 4 of FIG. 3A are switched. The signal light S1 which is converged by the convex lens 4 is reflected by the half mirror 3, and a part of the signal light S1 is inputted to the PD 30-1. In this constitution, since spreading of the incident pattern of the monitor light P1 to the PD 30-1 becomes less, an area of each overlap becomes less. However, in a case of FIG. 3B, the PDs 30-2~30-m (except the PD 30-1) may receive the monitor lights which are for adjacent PDs, due to a displacement or an angle misalignment of the convex lens 4, as shown in FIG. 4B.

In FIG. 3C, a collimating lens 5A, the half mirror 3 and a collimating lens 5B are disposed in a line on the optical axis of the light path between the LD 20-1 and the optical waveguide 2-1, and the PD 30-1 is disposed on the reflection light path of the half mirror 3.

In this constitution, although the number of components becomes greater than that in FIGS. 3A and 3B, since an output light of the LD 20-1 is a light beam collimated by the collimating lens 5A, the monitor light P1 reflected by the half mirror 3 can be inputted to the PD 30-1 while keeping the light beam substantially collimated. However, in a case of FIG. 3C, the PDs 30-2~30-m (except the PD 30-1) may receive the monitor lights which are for adjacent PDs, due to a displacement or an angle misalignment of the collimating lens 5A, as in the case of FIG. 3B.

Combinations of the LDs 20-2~20-n, the PDs 30-2~30m, and the optical waveguides 2-2~2-n are the same as the combination of the LD 20-1, the PD 30-1, and the optical waveguide 2-1.

Operation of Optical Transmitter

Figure 5:
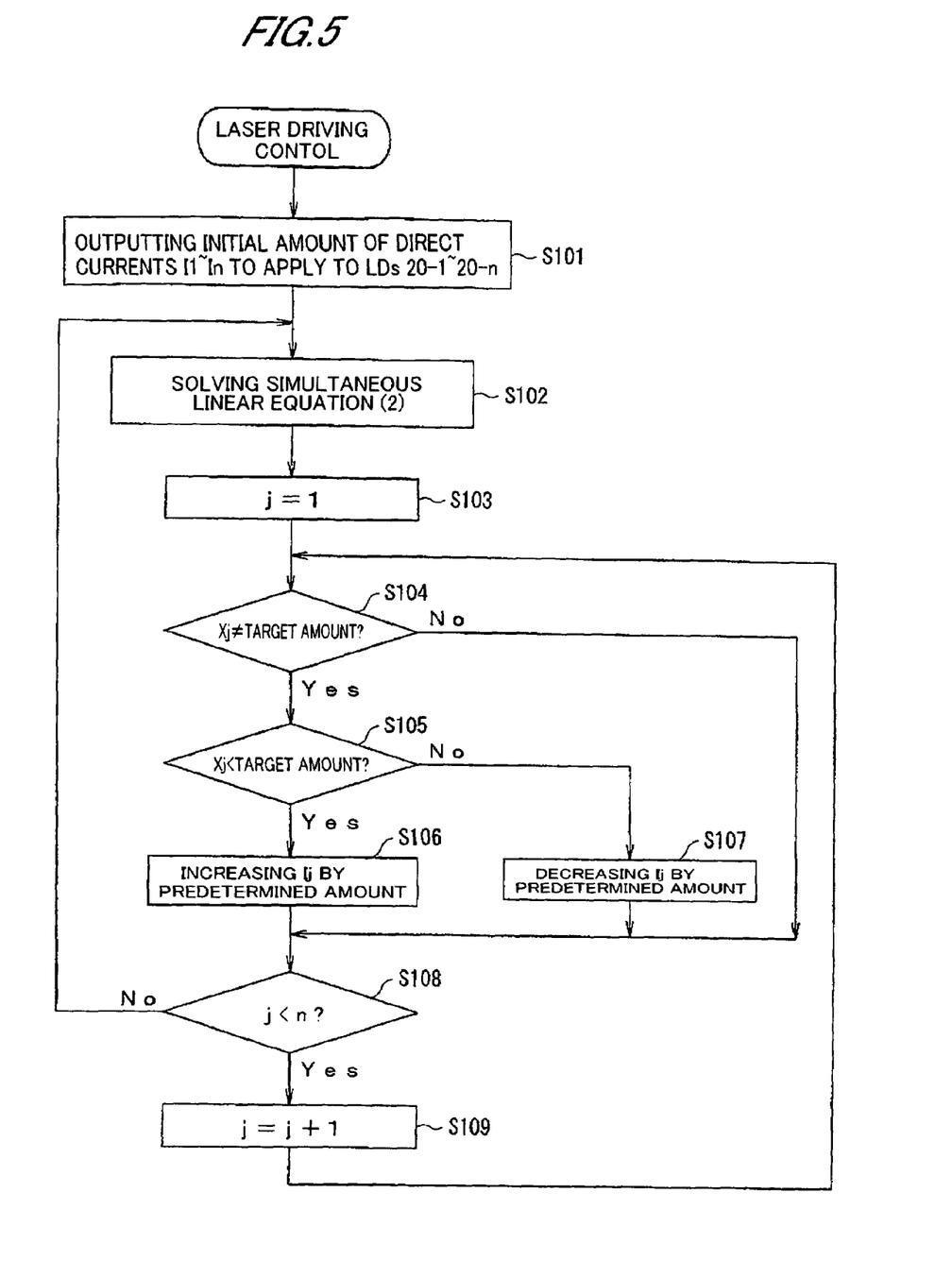
FIG. 5 shows a flowchart showing an execution by a micro processor unit (MPU) of an optical transmitter.

FIG. 5 shows an execution by the MPU 14 of the optical transmitter 1. The MPU 14 shown in FIG. 2 outputs an appropriate initial amount of the direct currents I1~In (e.g., an amount 1 mA more than a threshold of the LD) for applying to the LDs 20-1~20-n, to the drive circuit 12 (S101), and the LDs 20-1~20-n are emitted. The output lights of the LDs 20-1~20-n are monitored by the PDs 30-1~30m, and the photoelectric conversion currents B1~Bm are outputted in analog form from the PDs 30-1~30m.

In the controller 10, the photoelectric conversion currents B1~Bm are converted to digital signals by the A/D converter 13-1~13-m, and the digitized photoelectric conversion currents B1~Bm are provided to the MPU 14.

The MPU 14 removes crosstalk parts (i.e., crosstalk parts from adjacent monitor light as shown in FIG. 4) from the optical outputs included in the photoelectric conversion currents B1~Bm, and calculates an amount of the signal light of each of the LDs 20-1~20-n. In this case, each constant is defined as below by using i (i=1, 2, . . . , m) and j (J=1, 2, . . . , n).

Kj: a ratio of the monitor light Pj and the signal light Sj with respect to the LD 20-j (LD 20-j means one of the LDs 20-1~20-n);

Eij: an optical coupling efficiency of the PD 30-i and the monitor light Pj (PD 30-i means one of the PDs 30-1~30-m);

Ri: a photoelectric conversion efficiency of PD 30-i.

Using these constants, the relation between the signal light Sj and the photoelectric conversion current Bi of the PD 30-i is described as:

$$\Sigma_j K_i E_{ij} R_j S_j = B_i \qquad (1)$$

($\Sigma_j$ is a mathematical symbol of summation with respect to j (j=1~n)).

Further, if it is defined as "Aij=KiEijRj", then following simultaneous linear equation holds:

$$\sum_j AijXj = Bi \quad (2)$$

(i=1, 2, ... m)

If the Equation (2) has a Unique Solution Xj (J=1, 2, ... n), since by the equation (1) as a relational expression of the signal lights S1~Sn and the photoelectric conversion currents B1~Bm, the solution Xj is equal to the signal light Sj, the solution is also equal to the optical output monitor signal. Therefore, in the solution Xj, the crosstalk part is removed.

The MPU 14 solves the simultaneous linear equation (2), and outputs the solutions to the D/A converters 13-1~13-n as the optical output monitor signals X1~Xn.

Further, an example of exemplary setting methods of a coefficient matrix {Aij} is mentioned below. With respect to a certain integer j (j=1~n), only LD 20-j is applied with an appropriate current, the signal light thereof is defined as "S*j", and the photoelectric conversion current of the PD 30-i is monitored as "B*i". Thereat, a ratio of the signal light "S*j" and the photoelectric conversion current "B*i" is Aij (=S*j/B*I). When this method is performed about all of j (j=1~n), the coefficient matrix {Aij} can be sought.

Next, an exemplary calculation of the simultaneous linear equation (2) by the MPU 14 is mentioned below. When the m-by-n coefficient matrix {Aij}, which is detected by the method mentioned above, is defined "A", a square root $\sigma k$ (k=1~n) of an eigenvalue of a product $A^T A$ of a transposed matrix $A^T$ of A and A is called a "singular value", and by a m-by-n orthogonal matrix U and a n-by-n orthogonal matrix V, a singular value decomposition is described as $U^T A V = diag(\sigma k)$. In this case, diag($\sigma k$) indicates a diagonal matrix. Therefore, a pseudo inverse matrix $A^{-1}$ is described as below. Such an operation is well-known and descried in, for example, SATAKE Ichiro, "Senkei Daisu", Shokabo, P. 155.

$$A^{-1} = V diag(1/\sigma k) U^T$$

The pseudo inverse matrix $A^{-1}$ is preliminarily programmed in the MPU 14, the MPU 14 multiplies the pseudo inverse matrix $A^{-1}$ to the a vector $(B1, B2, \ldots, B)^T$ from the left thereof, a constituent of which is the detected photoelectric conversion current (B1, B2, . . . , B), and seeks a solution Xj of the equation (2). This solution Xj is the optical output monitor signal P, the crosstalk part of which is removed.

Next, an execution of a step S104 is performed by the MPU 14. When the solution Xj corresponds to a predetermined target amount (S104: NO), the execution continues at a step S108. When the solution Xj does not correspond to the predetermined target amount (S104: YES), the execution continues to a step S105.

In the step S105, when the solution Xj is less than the target amount (S105: YES), the direct current Ij is increased by the predetermined amount (e.g., 50 µA) (S106). Further, when the solution Xj is more than the target amount (S105: NO), the direct current Ij is decreased by the predetermined amount (S107).

When one of the steps S104 (NO), S106, and S107 is completed, a comparison of j and n is performed (S108).

If j≧n (S108: NO), the execution is returned to the step S102, and the steps following are performed again.

If j<n (S108: YES), after an execution of j=(j+1) is performed, the execution is returned to the step S104, and the steps following are performed again. When the executions are performed by J=n, control of the LDs 20-1~20-n is finished.

According to the first exemplary embodiment, in spite of whether or not there is a variation of the LDs 20-1~20-n, temperature change, service life deterioration, or a failure, each optical output of the LDs 20-1~20-n can be monitored accurately and individually and can be controlled.

Exemplary Embodiment 2

Figure 6:
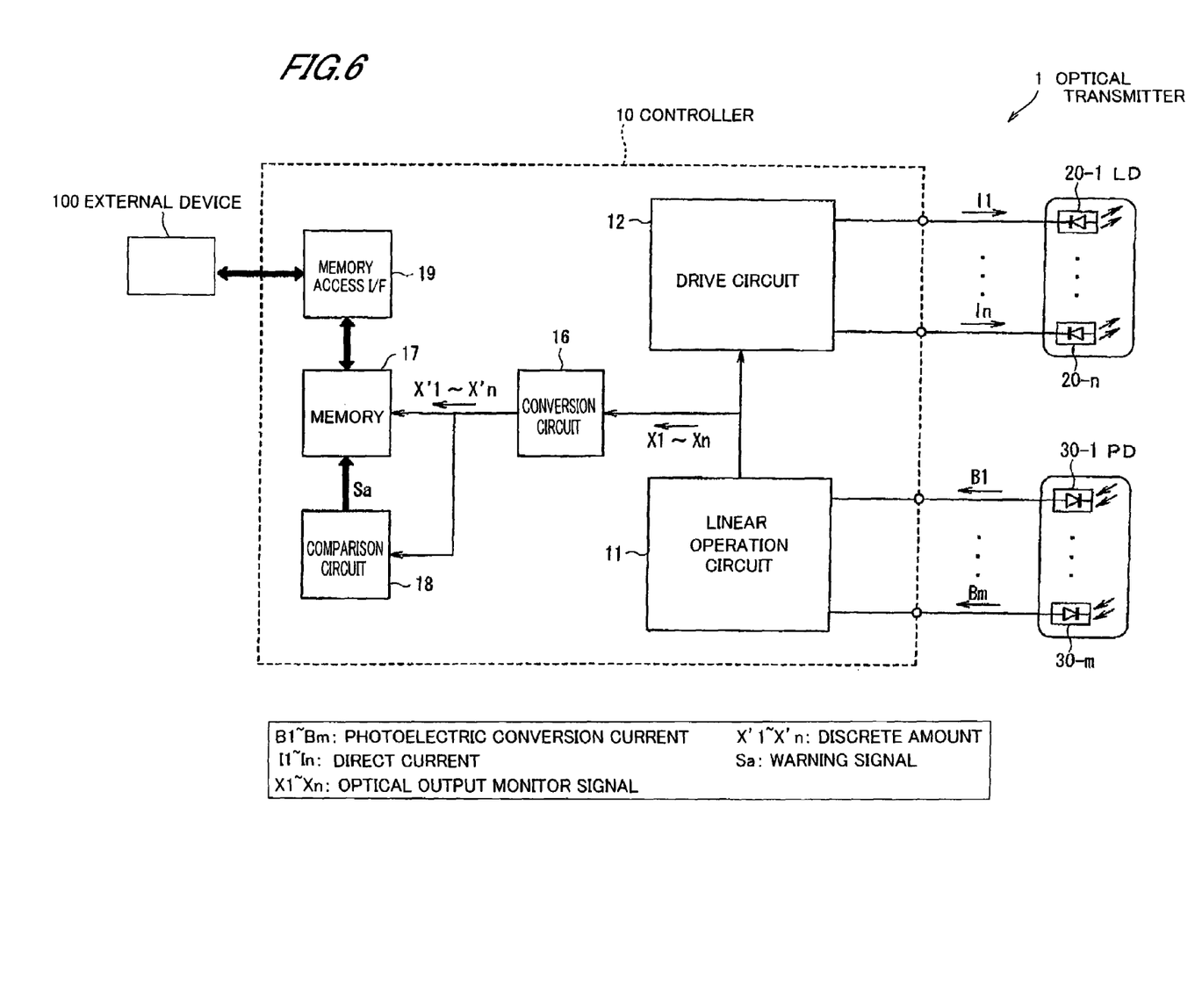
FIG. 6 is a block diagram showing an optical transmitter 1 in a second exemplary embodiment according to the present invention.

FIG. 6 shows an optical transmitter 1 in a second exemplary embodiment according to the present invention. The optical transmitter 1 in the second exemplary embodiment includes, as means of recording and communicating, a conversion circuit 16 for converting the optical output monitor signals X1~Xn to discrete amounts X'1~X'n which are defined by a predetermined rule, a memory 17 for storing the discrete amounts X'1~X'n converted by the conversion circuit 16, a comparison circuit 18 for generating warning signals Sa based on the discrete amounts X'1~X'n, and a memory access interface (I/F) circuit 19 for communicating with an external device 100. The second exemplary embodiment further includes the constitutions of the first exemplary embodiment shown in FIG. 1. In FIG. 6, the optical waveguides 2-1~2-n are omitted for clarity.

According to a predetermined rule, the conversion circuit 16, for example, converts the optical output (signal light S) of a real number to an integer value of 16 bits having LSB=0.1 µW (Least Significant Bit). In this example, multiplying the converted integer value of 16 bit by 0.1 µW, an amount of the optical output can be obtained. Further, the discrete amounts X'1~X'n are updated constantly (e.g., an exemplary 20 ms period) to the memory 17 by the linear operation circuit 11. Thereby, the external device can always obtain the newest data.

When the comparison circuit 18 detects a difference (error) of the discrete amounts X'1~X'n from the predetermined amount, the comparison circuit 18 generates the warning signals Sa and stores the warning signals Sa to the memory 17. The warning signals Sa are also updated constantly. The warning signals Sa are sent to the external device by the memory access I/F circuit 19.

The memory access I/F circuit 19 includes an RS-232C interface and an I2C (Inter Integrated Circuit) interface so as to permit an access to the memory 17 according to an order from the external device 100, and output the data stored in the memory 17 to the external device 100.

The above executions of the conversion circuit 16, the memory 17, the comparison circuit 18, and the memory access I/F circuit 19 can be achieved by setting a program in the MPU 14 of the linear operation circuit 11.

According to the second exemplary embodiment, numerous advantages can be obtained including the following.

(A) In addition to the advantages of the first exemplary embodiment, since the discrete amounts X'1~X'n (optical output amounts) and the warning signals Sa are updated to the memory 17 as needed and can be accessed by the external device, a condition of the optical transmitter 1 can be monitored by the external device. Therefore, the age deterioration (service life degradation) or the failure of each LD can be detected.

(B) Since the discrete amounts X'1~X'n and the warning signal Sa are stored in the memory 17, even if the number n of the LDs becomes greater, the optical output amounts need not be outputted in parallel transmission by lines. Therefore, wiring the lines is unnecessary, and configurations can be simplified.

Exemplary Embodiment 3

Configurations of the third exemplary embodiment are the same as the first exemplary embodiment. However, an optical coupling of the PDs 30-1~30-*m* and the monitor lights P1~Pn is designed so as to meet a following expression (4), when designing an implementation of the optical system.

(an optical coupling condition of the monitor light and the PD)

When multiplying n-by-m matrix {Dki} to the equation (2) from left thereof, a following n-by-n simultaneous linear equation is obtained.

$$\Sigma_j C k j X j = B' k \quad (3)$$

(k=1, 2, . . . , n, Ckj=$\Sigma_i$DkiAij, Bi=$\Sigma_i$DkiBi)

Therefore, if this n-by-n simultaneous linear equation (3) has a unique solution, the m-by-n simultaneous linear equation (2) also has a unique solution.

A necessary and sufficient condition for the unique solution of the equation (3) is that the coefficient matrix {Cij} is non-singular. However, when designing the optical system, it is difficult to determine whether the matrix {Cij} is non-singular or not with respect to any conditions of the implementation. In this case, using a sufficient condition (Levy-Desplanques theorem) in which the matrix {Cij} is non-singular, the unique solution can be easily obtained.

Next, a calculation example of the equation (3) by the MPU 14 is described. In the MPU 14, an inverse matrix "$C^{-1}$" of the coefficient matrix {Cij} and the n-by-m matrix D={Dki} are programmed. The MPU 14 multiplies $C^{-1}$D to the vector (B1, B2, . . . , B)$^T$ which is constituted by the photoelectric conversion currents, from the left thereof, and seeks the solution Xj of the equation (2).

$$|Ckk| > \Sigma_{j \neq k} |Ckj| \quad (4)$$

(k=1, 2, . . . , n)

In the expression (4), $\Sigma_{j \neq k}$ is a symbol of a summation with respect to j=1~n except j=k. The matrix {Ckj} which meets the expression (4) is called as a "strictly diagonally dominant matrix", and the solution (optical output monitor signals X1~Xn) can be obtained. In the expression (4), |Ckk| indicates diagonal elements (signal part) and |Ckj| indicates non-diagonal elements (crosstalk part).

Although the matrix {Dki} can be selected voluntarily by the designer, an exemplary method for selecting the matrix is described below. For example, a transposed matrix of the coefficient matrix {Aij} is used as {Dki}, that is, Dki=Aik. In this case, the following states occur.

(1) Diagonal elements Ckk=$\Sigma_i$AikAik of the coefficient matrix {Ckj} are a summation (sum of squares) of the optical coupling efficiency Aik with respect to only the monitor light Pk of the LD 20-*k* which is inputted to the PDs 30-1~30-*m*.

(2) Non-diagonal elements Ckk=$\Sigma_i$AikAij (j≠k) of the coefficient matrix {Ckj} is a summation of the PD, in which the monitor light Pk and Pj inputted to the PDs 30-1~30*m* superpose each other and are crosstalk.

Therefore, the expression (4) as the sufficient condition indicates that it is sufficient that a summation (left side) of the monitor light Pk of the LD 20-*k* is greater than a summation (right side) of the crosstalk which is the monitor light from the LDs 20 other than the LD 20-*k*.

According to the third exemplary embodiment, since the solution of the simultaneous linear equation (2) can be determined uniquely by designing the optical coupling of the optical system of the PDs 30-1~30-*m* and the monitor lights P1~Pn so as to meet the expression (4), the optical output monitor signals X1~Xn can be obtained reliably and exactly.

Exemplary Embodiment 4

Figure 7:
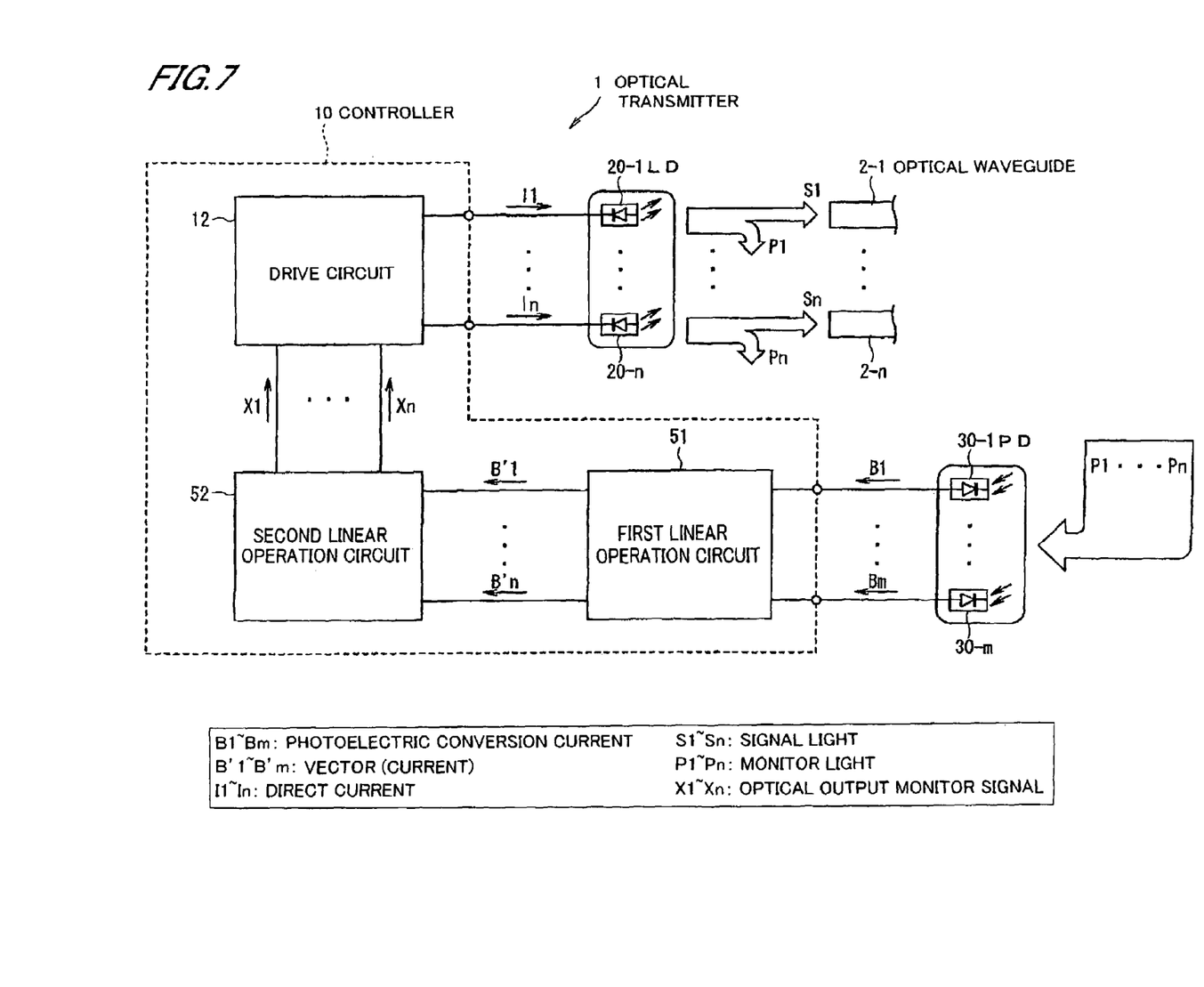
FIG. 7 is a block diagram showing an optical transmitter 1 in a fourth exemplary embodiment according to the present invention.

FIG. 7 shows a fourth exemplary embodiment according to the present invention. In this exemplary embodiment, the linear operation circuit 11 in the first exemplary embodiment includes a first linear operation circuit 51 for preprocessing the photoelectric conversion currents B1~Bm, and a second linear operation circuit 52 for calculating a simultaneous linear equation with respect to the photoelectric conversion currents B'1~B'm which are preprocessed by the first linear operation circuit 51. Other constitutions of this exemplary embodiment are same as the first exemplary embodiment.

As mentioned in the third exemplary embodiment, when the n-by-m matrix D={Dki} is multiplied to the m-by-n coefficient matrix A={Aij} from the left thereof, the n-by-n matrix C={Ckj} can be obtained. Similarly, when the matrix D is multiplied to the m dimension vector B=(B1, . . . , Bm)$^T$, elements of which are the photoelectric conversion currents, the n dimension vector B'=(B'1, . . . , B'm)$^T$ can be obtained.

When the inverse matrix $C^{-1}$ is multiplied to the vector B' which is preprocessed by the matrix D, the solution Xj (j=1~n) of the simultaneous linear equation (2) can be sought. In this exemplary embodiment, the first linear operation circuit 51 outputs the vector B' by the operation DB, and the second linear operation circuit 52 outputs the monitor signal Xj (j=1~n) by the operation $C^{-1}$B'. For simplification of explanation, a constitution of 4 LDs and 9 PDs (n=4, m=9) is explained below.

Figure 8:
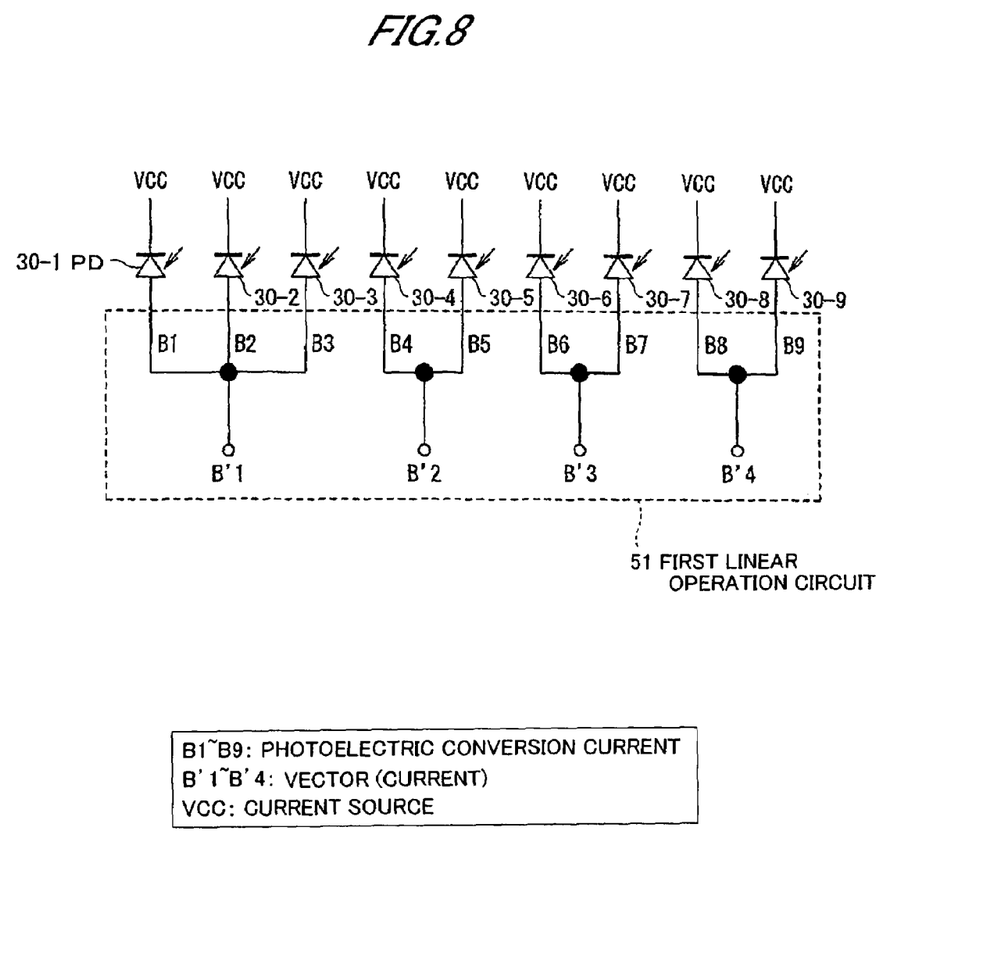
FIG. 8 is a schematic diagram showing a functional constitution of a first linear operation circuit 51 of FIG. 7.

FIG. 8 shows a functional constitution of the first linear operation circuit 51. Cathodes of the PDs 30-1~30-9 are connected to the power supply voltage Vcc, and for the anodes, each pair of the PDs 30-1~30-3, the PDs 30-4 and 30-5, the PDs 30-6 and 30-7, and the PDs 30-8 and 30-9 is connected in parallel.

With respect to the photoelectric conversion currents B1~B3 by the PDs 30-1~30-3, the photoelectric conversion currents B4 and B5 by the PDs 30-4 and 30-5, the photoelectric conversion currents B6 and B7 by the PDs 30-6 and 30-7, and the photoelectric conversion currents B8 and B9 by the PDs 30-8 and 30-9, the first linear operation circuit 51 converts the photoelectric conversion currents B1~B3 to the current B'1, converts the photoelectric conversion currents B4 and B5 to the current B'2, converts the photoelectric conversion currents B6 and B7 to the current B'3, and converts the photoelectric conversion currents B8 and B9 to the current B'4. Thereby, the currents B'1~B'4 which are related to the 4 LDs and processed by the first linear operation circuit 51 are outputted to the second linear operation circuit 52. The matrix D of this case is described as below.

$$D = \begin{bmatrix} 1 & 1 & 1 & 0 & 0 & 0 & 0 & 0 & 0 \\ 0 & 0 & 0 & 1 & 1 & 0 & 0 & 0 & 0 \\ 0 & 0 & 0 & 0 & 0 & 1 & 1 & 0 & 0 \\ 0 & 0 & 0 & 0 & 0 & 0 & 0 & 1 & 1 \end{bmatrix} \quad (4)$$

The currents B'1~B'4 which are preprocessed by the matrix D are as following.

$$B'1 = B1 + B2 + B3$$

$$B'2 = B4 + B5$$

$$B'3 = B6 + B7$$

$$B'4 = B8 + B9$$

In this example, by selecting the optical system as below so as to meet the expression (4) as the sufficient condition in which the coefficient matrix C is non-singular, each photoelectric conversion current can be sought.

Input more than 50% of the monitor light P1 coupled optically by the PDs 30-1~30-9 to the PDs 30-1~30-3.

Input more than 50% of the monitor light P2 coupled optically by the PDs 30-1~30-9 to the PDs 30-4 and 30-5.

Input more than 50% of the monitor light P3 coupled optically by the PDs 30-1~30-9 to the PDs 30-6 and 30-7.

Input more than 50% of the monitor light P4 coupled optically by the PDs 30-1~30-9 to the PDs 30-8 and 30-9.

The connection method of the 9 PDs 30-1~30-9 according to the first linear operation circuit 51 (that is, the matrix D) is not limited to the method described above. Conversely, it is possible to seek the matrix D which meets the expression (4) as the sufficient condition by a design value of the coefficient matrix {Aij} (i=1~9, j=1~4) and to design the first linear operation circuit 51 accordingly.

In the second linear operation circuit 52 to solve the simultaneous linear equation, the coefficient matrix C (or inverse matrix $C^{-1}$) should be set previously. One example of the setting method is mentioned below.

With respect to a certain integer j (j=1~n), only the LD 20-*j* is applied with an appropriate current, the signal light S*j therat and the output current B'*k (k=1~n) from the first linear operation circuit 51 are measured. A ratio of the signal light S*j and the output current B'*k is Ckj (=S*j/B'*k)

According to the fourth exemplary embodiment, numerous advantages can be obtained including the following.

(A) Since the linear operation circuit 11 in the first exemplary embodiment includes the first linear operation circuit 51 for preprocessing the photoelectric conversion currents B1~Bm, and the second linear operation circuit 52 for calculating the simultaneous linear equation by using the currents B'1~B'm preprocessed by the first linear operation circuit 51, even though the number (m) of the photoelectric conversion currents B (i.e., the number of the PDs) becomes greater, the number of the inputs to the second linear operation circuit 52 can be less.

(B) According to (A), the number of the inputs to the second linear operation circuit 52 can be reduced, and a circuit and a line pattern can be simplified.

Other Exemplary Embodiments

Although the invention has been described with respect to specific exemplary embodiments for complete and clear disclosure, the appended claims are not to be thus limited but are to be construed as embodying all modifications and alternative constructions that may occur to one skilled in the art which fairly fall within the basic teaching herein set forth.

Further, it is noted that Applicant's intent is to encompass equivalents of all claim elements, even if amended later during prosecution.

What is claimed is:

1. An optical transmitter, comprising:
   a plurality of light-emitting elements that transmits optical outputs having crosstalk parts arising from optical outputs of adjacent light-emitting elements;
   a plurality of light-receiving elements that monitors said optical outputs from said light-emitting elements, converts said optical outputs into a plurality of photoelectric conversion currents, and outputs said plurality of photoelectric conversion currents;
   a linear operation circuit that receives said plurality of photoelectric conversion currents from said plurality of light-receiving elements, removes said crosstalk parts from said plurality of photoelectric conversion currents to form optical output monitor signals, and outputs said optical output monitor signals; and
   a drive circuit that receives said optical output monitor signals from said linear operation circuit and drives individually currents to apply to said light-emitting elements based on said optical output monitor signals,
   wherein said linear operation circuit solves a simultaneous linear equation $$\sum_j AijXj = Bi (i = 1, 2, \ldots, m; j = 1, 2, \ldots, n),$$

and outputs said optical output monitor signals Xj, where Aij is an optical coupling efficiency between an i-th light-receiving element of said plurality of light-receiving elements and a j-th light-emitting element of said plurality of light-emitting elements or a value in proportion to said optical coupling efficiency, $\Sigma_j$ represents a summation in relation to j, m is an amount of the plurality of light-receiving elements, n is an amount of the plurality of light-emitting elements, and Bi is an i-th photoelectric conversion current of said plurality of photoelectric conversion currents.

2. An optical transmitter according to claim 1, wherein said linear operation circuit is connected to a recording and communicating unit that sends a value of said optical output monitor signals to an external device.

3. An optical transmitter according to claim 2, wherein said recording and communicating unit comprises:
   a memory that stores said optical output monitor signals; and
   a memory access interface circuit that communicates with said external device.

4. An optical transmitter according to claim 3, wherein said recording and communicating unit further comprises a comparison circuit that generates warning signals based on said optical output monitor signals and stores the warning signals in said memory.

5. An optical transmitter according to claim 1, wherein said linear operation circuit comprises:
   a first linear operation circuit that preprocesses with respect to said photoelectric conversion currents, by multiplying an n-by-m matrix D to an m-dimension vector B={Bi}, to output an n-dimension vector B' as a result; and
   a second linear operation circuit that solves said simultaneous linear equation by multiplying an inverse matrix $C^{-1}$ to the n-dimension vector B' where $C^{-1}$ is an inverse matrix of an n-by-n matrix C, A={Ai} is an m-by-n coefficient matrix, and C=DA.

6. An optical transmitter according to claim 1, wherein said linear operation circuit comprises:
   a plurality of analog/digital (A/D) converters that receives and digitizes the plurality of photoelectric conversion currents outputted in analog form from the plurality of light-receiving elements;
   a microprocessor unit that receives the plurality of photoelectric conversion currents that was digitized by the plurality of A/D converters, solves the simultaneous linear equation, and outputs solutions to the simultaneous linear equation; and
   a plurality of digital/analog (D/A) converters that receives the solutions to the simultaneous linear equation as the optical output monitor signals, converts the optical output monitor signals to analog form, and sends the optical output monitor signals in analog form to the drive circuit.

7. An optical transmitter, comprising:
a plurality of light-emitting elements that transmits optical outputs having crosstalk parts arising from optical outputs of adjacent light-emitting elements;
a plurality of light-receiving elements that monitors said optical outputs from said light-emitting elements, converts said optical outputs into a plurality of photoelectric conversion currents, and outputs said plurality of photoelectric conversion currents;
a linear operation circuit that receives said plurality of photoelectric conversion currents from said plurality of light-receiving elements, removes said crosstalk parts from said plurality of photoelectric conversion currents to form optical output monitor signals, and outputs said optical output monitor signals; and
a drive circuit that receives said optical output monitor signals from said linear operation circuit and drives individually currents to apply to said light-emitting elements based on said optical output monitor signals, wherein:
said light-emitting elements and said light-receiving elements are coupled optically so that an n-by-n matrix C=DA is a strictly diagonally dominant matrix $$|Ckk| > \sum_{j \neq k} |Ckj|$$

(k=1, 2, ... n; Ckj comprises an element of the matrix C;

$$\sum_{j \neq k}$$

comprises a symbol of a summation with respect to j=1~n except j=k), which is a coefficient matrix A={Aij} constituted by Aij which comprises an optical coupling efficiency between an i-th light-receiving element of said plurality of light-receiving elements and a j-th light-emitting element of said plurality of light-emitting elements or a value in proportion to said optical coupling efficiency, multiplied by a n-by-m matrix D from a left side.

8. A method for optical transmission, comprising:
monitoring optical outputs from a plurality of light-emitting elements;
calculating optical output monitor signals by removing crosstalk parts from a plurality of photoelectric conversion currents outputted from a plurality of light-receiving elements, the crosstalk parts arising from adjacent light-emitting elements; and
driving individually currents to apply to said light-emitting elements based on said optical output monitor signals,
said method further comprising:
solving a simultaneous linear equation $$\sum_{j} AijXj = Bi (i = 1, 2, \ldots m; j = 1, 2, \ldots, n);$$

and
outputting said optical output monitor signals Xj,
wherein Aij is an optical coupling efficiency between an i-th light-receiving element of said plurality of light-receiving elements and a j-th light-emitting element of said plurality of light-emitting elements or a value in proportion to said optical coupling efficiency, $$\sum_{j}$$

represents a summation in relation to j, m is an amount of the plurality of light-receiving elements, n is an amount of the plurality of light-emitting elements, and Bi is an i-th photoelectric conversion current of said plurality of photoelectric conversion currents.

9. A method of optical transmission according to claim 8, further comprising:
sending a value of said optical output monitor signals to an external device.

10. A method of optical transmission according to claim 9, further comprising:
storing said optical output monitor signals in a memory; and
communicating with said external device by a memory access interface circuit.

11. A method of optical transmission according to claim 10, further comprising:
generating warning signals based on said optical output monitor signals; and
storing the warning signals in said memory.

12. A method of optical transmission according to claim 8, further comprising:
preprocessing with respect to said photoelectric conversion currents by multiplying an n-by-m matrix D to an m-dimension vector B={Bi}, to output an n-dimension vector B' as a result; and
solving said simultaneous linear equation by multiplying an inverse matrix $C^{-1}$ to the n-dimension vector B' where $C^{-1}$ is an inverse matrix of an n-by-n matrix C, A={Aij} is an m-by-n coefficient matrix, and C=DA.

13. A method of optical transmission according to claim 8, wherein a plurality of analog/digital (A/D) converters receives and digitizes the plurality of photoelectric conversion currents outputted in analog form from the plurality of light-receiving elements,
wherein a microprocessor unit receives the plurality of photoelectric conversion currents that was digitized by the plurality of A/D converters, solves the simultaneous linear equation, and outputs solutions to the simultaneous linear equation, and
wherein a plurality of digital/analog (D/A) converters receives the solutions to the simultaneous linear equation as a plurality of optical output monitor signals, converts the plurality of optical output monitor signals to analog form, and sends the plurality of optical output monitor signals in analog form to perform the driving individually of the currents.

14. A method for optical transmission, comprising:
monitoring optical outputs from a plurality of light-emitting elements;
calculating optical output monitor signals by removing crosstalk parts from a plurality of photoelectric conversion currents outputted from a plurality of light-receiving elements, the crosstalk parts arising from adjacent light-emitting elements; and driving individually currents to apply to said light-emitting elements based on said optical output monitor signals, said method further comprising:

coupling said light-emitting elements and said light-receiving elements optically so that an n-by-n matrix C=DA is a strictly diagonally dominant matrix $$|Ckk| > \sum_{j \neq k} |Ckj|$$

(k=1, 2, ... n; Ckj comprises an element of the matrix C;

$$\sum_{j \neq k}$$

comprises a symbol of a summation with respect to j=1~n except j=k, which is a coefficient matrix A={Aij} constituted by Aij which comprises an optical coupling efficiency between an i-th light-receiving element of said plurality of light-receiving elements and a j-th light-emitting element of said plurality of light-emitting elements or a value in proportion to said optical coupling efficiency, multiplied by a n-by-m matrix D from a left side.

\* \* \* \* \*